(12) United States Patent
Schumacher (10) Patent No.: US 6,998,569 B2
(45) Date of Patent: Feb. 14, 2006

(54) APPARATUS AND METHOD FOR REGULATING THE WELD SEAM POSITION DURING LASER WELDING OF A BUTT-JOINTED WORKPIECE

(75) Inventor: Joerg Schumacher, Kirchlinteln (DE)

(73) Assignee: Airbus Deutschland GmbH, Hamburg (DE)

( * ) Notice: Subject to any disclaimer, the term of this patent is extended or adjusted under 35 U.S.C. 154(b) by 331 days.

(21) Appl. No.: 10/616,688

(22) Filed: Jul. 9, 2003

(65) Prior Publication Data

US 2004/0134891 A1 Jul. 15, 2004

(30) Foreign Application Priority Data

Jul. 9, 2002 (DE) ........................................ 102 34 242

(51) Int. Cl.
B23K 26/04 (2006.01)

(52) U.S. Cl. ............................ 219/121.63; 219/121.64; 219/121.83

(58) Field of Classification Search ............ 219/121.63, 219/121.64, 121.61, 121.62, 121.78, 121.82, 219/121.83

See application file for complete search history.

(56) References Cited

U.S. PATENT DOCUMENTS

| | | | |
|---|---|---|---|
| 4,223,201 A | | 9/1980 | Peters et al. |
| 4,223,202 A | | 9/1980 | Peters et al. |
| 4,644,129 A | | 2/1987 | Miller |
| 4,700,045 A | | 10/1987 | Merry et al. |
| 4,841,617 A | | 6/1989 | Schmidt et al. |
| 4,924,063 A | | 5/1990 | Buechel et al. |
| 5,001,324 A | | 3/1991 | Aiello et al. |
| 5,045,668 A | | 9/1991 | Neiheisel et al. |
| 5,142,118 A | | 8/1992 | Schlatter |
| 5,329,091 A | * | 7/1994 | Bissinger ................ 219/121.83 |
| 5,483,034 A | | 1/1996 | Havard et al. |
| 5,841,098 A | | 11/1998 | Gedrat et al. |
| 5,961,858 A | * | 10/1999 | Britnell .................. 219/121.63 |
| 6,274,843 B1 | | 8/2001 | Dabezies et al. |
| 6,596,961 B1 | * | 7/2003 | Ehlers et al. ........... 219/121.63 |
| 6,670,574 B1 | * | 12/2003 | Bates et al. ............. 219/121.64 |

FOREIGN PATENT DOCUMENTS

| | | |
|---|---|---|
| DE | 4216643 | 11/1993 |
| EP | 0310793 | 4/1989 |
| EP | 0445633 | 9/1991 |
| JP | 54100948 | 8/1979 |
| JP | 61229489 | 10/1986 |
| JP | 63154283 | 6/1988 |
| JP | 5154678 | 6/1993 |

OTHER PUBLICATIONS

Internet Web pages from http:/www.falldorf-sensor.de; Falldorf & Co. GmbH, Consulting & Engineering; Bremen, Germany; printed Oct. 2003.

* cited by examiner

Primary Examiner—Samuel M. Heinrich
(74) Attorney, Agent, or Firm—W. F. Fasse; W. G. Fasse (57) ABSTRACT

To regulate a laser welding process, an optical sensor detects the seam flank angle and/or the seam position of the laser welded seam directly following its formation, the resulting actual measured information is compared with stored or externally provided nominal information to give a comparison result, and the position of the welding laser beam source is adjusted based on the comparison result to regulate-out any divergence between the actual measured information and the nominal information. The apparatus includes a laser welding device including a welding laser beam source that moves along the joint to be welded, an optical sensor arranged directly on or following the laser welding device, and a circuit including a comparator that compares the actual measured information with the stored or externally provided nominal information regarding the seam flank angle and/or the seam position. The laser beam source is movable to adjust the location and orientation of the generated laser beam and its penetration into the weld joint responsive to the comparison result.

30 Claims, 4 Drawing Sheets

APPARATUS AND METHOD FOR REGULATING THE WELD SEAM POSITION DURING LASER WELDING OF A BUTT-JOINTED WORKPIECE

PRIORITY CLAIM

This application is based on and claims the priority under 35 U.S.C. §119 of German Patent Application 102 34 242.3, filed on Jul. 9, 2002, the entire disclosure of which is incorporated herein by reference.

FIELD OF THE INVENTION

The invention relates to an apparatus and a method for regulating the weld seam position of a laser beam welded butt joint of two workpieces.

BACKGROUND INFORMATION

It is well known in the art to weld butt-jointed workpiece components using one or more laser beams to form a weld seam between the butt-jointed workpiece components. Many factors influence the quality of the resulting weld seam. The influence of various welding parameters on the seam flank angle $\alpha$ of a laser beam weld seam only becomes apparent on the completed welded workpiece, for example when inspecting the laser weld seam for quality control purposes. At that time, it is often discovered that the laser weld seam does not meet the quality requirements or expectations. When it is discovered in the subsequent quality control measures, that a laser welded workpiece does not meet the quality requirements, it is often necessary to re-work or especially re-weld at least portions of the laser welded seam of a rejected workpiece. That significantly increases the technological costs of a finished welded component on a per-piece basis. Particularly, such re-welding work is carried out on a previously laser welded component when it is subsequently determined that the weld seam angle $\alpha$ lies outside of the acceptable tolerance range. Therefore, in order to minimize or limit the reject rate of laser welded workpieces, which have been welded with conventionally known laser welding equipment, there is a need for an intensive monitoring of the seam flank angle $\alpha$ during the laser beam welding of workpieces such as stringer-skin components in the manufacture of aircraft fuselages.

The weld seam angle $\alpha$ is regarded as an essential basic starting value or initial value for the laser welding of welded components such as a stringer-skin arrangement in the manufacture of aircraft fuselages, because it is known that the resulting weld seam angle $\alpha$ has an influence on the quality of the laser weld seam in the finished welded part. Traditionally, however, the evaluation of the weld seam angle $\alpha$ is only carried out after completion of the welding of the entire weld seam. On the other hand, solutions that can have a direct influence on the welding process itself, i.e. during the welding process, to achieve an adjustment or variation of the weld seam angle $\alpha$ being formed, in order to achieve a qualitatively acceptable weld seam, are not known. In this context, the primary welded components of importance involve stringers standing perpendicularly on a skin sheet, also known as a "flat sheetmetal shell" in the art of aircraft fuselage manufacture. The final weld seam angle $\alpha$ results from the position of the laser beam and its relative location and orientation with respect to the welded butt of the parts to be joined, for example the skin-stringer butt. In this regard, the weld seam angle $\alpha$ is the angle lying between the plane of the sheetmetal skin and the finished surface of the weld seam or weld bead. The resulting weld seam angle $\alpha$ is influenced by several factors, whereby an influence on the seam position and in correlation to the expected seam flange angle $\alpha$ of the finished weld seam can already arise before the beginning of the welding process.

Previously, the position and orientation of the laser beam relative to the weld butt joint of the parts (e.g. the skin-stringer butt) has been fixedly prescribed before the laser welding process is carried out. With such a preparation for the laser welding process, the prescribed laser beam position, e.g. location and orientation, is based on a theoretically expected seam position with respect to a seam flank angle of the welded seam.

One must further consider that several factors arising only during the welding process can also have an unintended and undesired influence on the further performance of the welding process. Such unforeseeable interferences, for example involve or arise from the shifting, straining, or tilting of the workpiece components to be welded, for example the stringer on the skin, the variation of the position tolerances of the laser beam, tolerances of the workpiece thickness that have not been taken into consideration, e.g. the stringer thickness, tolerances and variations arising from torsion and bending of the workpiece through a roll guidance thereof, and tolerances of a tactile optical sensor for sensing or monitoring the butt joint. When such factors have an unintended influence on the welding process during the performance of the welding process itself, there is no known further possibility by which one could have a decisive or effective influence on the formation of the seam position or on the fluctuations of the seam flank angle $\alpha$ during the occurring laser welding process, in order to achieve a corresponding high workpiece quality of the laser welded parts.

It is especially difficult and problematic to maintain the prescribed tolerance limits for the seam flank angle $\alpha$ when laser welding spherically curved skin sheets or fields. Also, the great amount of time required for the proper adjustment and set up for welding each stringer on such a spherically curved skin field will add further difficulty and expense to the often required re-welding to correct finished weld seams of sub-standard quality.

Conventionally, it is known to carry out an optical monitoring and measuring of the resulting weld seam after completion of the laser welding of the parts to be joined, for example the skin-stringer joint. Such optical inspection and measuring is conventionally carried out, for example, with known light section processes using linear light beam or light line projection, for example by means of a known light section sensor, i.e. a so-called Falldorf sensor produced and sold by the Falldorf & Co. GmbH company (Falldorf & Co. GmbH, Consulting & Engineering, Fahrenheit Strasse 1, 28359 Bremen, Germany or at the internet address http://www.falldorf.de). In this manner, the laser welded joint can be evaluated with respect to the requirements relating to the weld seam quality. Such a welding apparatus, with such a subsequent optical weld seam quality inspection arrangement, is based on the theoretically expected seam position or particularly the expected seam flank angle $\alpha$ of a laser weld seam which is determined with consideration of known values based on prior experience. With such conventionally known measures, the welding process cannot be positively influenced during the performance of the welding process itself, because the known measures do not provide for the regulation of the seam position or especially the seam flank angle $\alpha$ during the welding process, but rather only inspection and evaluation of these weld seam features after completion of the welding process.

It has also previously been known to use a mechanical sensor that mechanically senses or detects the position of the butt joint such as the stringer-skin butt at a position running ahead or spaced ahead of the welding point, in order to correct the initially prescribed seam position. It has been found in practice, that this arrangement using a mechanical sensor running ahead of the weld point does not always lead to acceptable seam flank angles α in the finished welded product. For example, the above mentioned interference values that arise during the welding process cannot be adequately compensated for using such an arrangement with a mechanical sensor.

Furthermore, the German Patent Laying-Open Document DE 42 16 643 A1, and especially FIGS. 2, 8, and 22 thereof, disclose an apparatus for regulating the seam position of a laser welded profile or sectional component, especially involving the edge surface of a first component butting perpendicularly against the upper surface of a second sectional component, whereby these two components are welded together to form a single welded workpiece by means of two weld seams along the edge of the butt joint on opposite sides of the first butting component, whereby each of these weld seams is respectively formed by a welding laser beam.

According to the known apparatus and method disclosed by DE 42 16 643 A1, and especially FIG. 7 in connection with col. 9, lines 30 et. seq., the angle at which the laser beams meet or impinge on the workpiece outer surface, and which influences the seam position, is regulated dependent on the measuring results of a measuring instrument. Thus, the apparatus disclosed therein apparently comprises several system components that are serially arranged and connected to each other in an information technical manner, i.e. for data exchange. The system components especially include a seam position component for varying the seam position, a laser welding processing component with two integrated welding laser beam sources as well as a seam position regulating arrangement. Moreover, a sensor arrangement for sensing or detecting characteristic values of the laser welded seam is arranged near the laser welding process component. The sensor arrangement, and particularly the respective sensor, is arranged to run along after or with the welding laser beam sources that move along with the welding speed along the welding seam (see claim 12 of DE 42 16 643 A1). The sensor arrangement is connected for information exchange with the seam position regulating arrangement (see DE 42 16 643 A1 at FIG. 8 in connection with col. 9, lines 42 et. seq., as well as FIG. 22 in connection with col. 12, line 10 et. seq), whereupon the seam position regulating arrangement receives or picks up the sensor information that has been converted to corresponding sensor signals. In this regard, the seam position regulating arrangement is apparently internally equipped with a circuit that carries out an information comparison of the sensor informations that are derived externally from the circuit, but delivered to the circuit during the welding process, with a nominal or desired value information. Then, after the information comparison, based on the result of the comparison, the circuit generates a regulating value for the process parameters, which are provided at the output of the seam position regulating arrangement and delivered to the seam position component for varying the seam position.

The above described known prior art does not disclose and would not have suggested an arrangement and a method for regulating the seam position of a laser beam welded sectional workpiece, using a sensor arrangement for detecting or sensing the weld seam angle during the performance of the welding operation, in order to adjust the welding parameters "on the fly" still during the welding operation, to thereby correctively or adjustingly influence the weld position of the weld seam as it is being formed.

SUMMARY OF THE INVENTION

In view of the above, it is an object of the invention to provide an apparatus and a method for regulating the seam position of a laser weld seam on a welded sectional component, with which the position, e.g. the location and/or the orientation, of the welding laser beam source is influenced during the welding process in such a manner so that the resulting surface geometry of the achieved weld seam can be improved through a regulated influence on the seam position and the seam flank angle α on an ongoing basis during the welding operation. A further aim of the invention is to already compensate for or even-out even small fluctuations of the seam flank angle α during the welding process, whereby acceptable tolerance values of the seam flank angle α are achieved. Another object of the invention is to provide such a method and such an apparatus through the use of which the need for re-welding or re-working of a weld seam is completely avoided. The invention further aims to avoid or overcome the disadvantages of the prior art, and to achieve additional advantages, as apparent from the present specification.

The above objects have been achieved according to the invention in an apparatus for regulating the seam position of a laser welded seam of a welded sectional workpiece including a first component butted perpendicularly with its edge surface on the outer surface of a second profile or sectional component, to form two laser weld seams on opposite sides of the first component along the edge of the weld butt, using a respective laser beam on each side to form the respective laser weld seam. The apparatus comprises several serially arranged system components that are interconnected for data exchange, including a seam position component for varying the seam position, a laser welding process component with two integrated welded laser beam sources for respectively forming the individual laser weld seams. The apparatus further includes a seam position regulating arrangement of which the output is connected for data exchange to the seam position component, as well as a sensor arrangement that is installed directly on or near the laser welding process component, and which is arranged to follow or move along with the welding laser beam sources that move horizontally in the welding direction at the welding speed, and is connected for data exchange with the seam position regulating arrangement, which receives the sensor information that has been converted to corresponding sensor signals at a first input thereof. Furthermore, the seam position regulating arrangement is internally equipped with a circuit that is integrated through the interconnection of several functionally connected circuit components. The circuit is adapted to carry out an information comparison of the sensor informations that are obtained externally from the circuit and continuously delivered to the circuit during the welding process, with a nominal or desired value information, and then to generate a regulation value for the process parameters based on the comparison result after completion of the information comparison, whereby this regulation value is provided at the output of the seam position regulating arrangement and is provided to the seam position components for varying the seam position. Further especially according to the invention, the apparatus additionally comprises a sensor arrangement for detecting or sensing the seam flank angle (or another weld seam parameter such as the seam position) of the formed laser weld seam integrated therein, and the seam position regulating arrangement generates a regulating value for the variation or adjustment of the seam flank angle, whereby the generation of this regulating value comprises or is based on an information comparison of the sensor-measured actual weld seam flank angle with a nominal or desired value information of the desired seam flank angle.

The above objects have further been achieved according to the invention in a method for regulating the seam position of a laser weld seam using the inventive apparatus. According to the inventive method, the two parts or components that are to be joined are prepared for the following laser welding process, and then the respective position, e.g. location and orientation, of two welding laser beam sources are respectively adjusted by the seam position components based on a regulating value for the variation of the seam flank angle that will correspond to a nominal or desired value information of the seam flank angle. Then, the actual welding process is carried out in that the two components are welded together to form a welded component by the two laser weld seams on the two sides of the weld butt, whereby each one of the two laser beams is generated by a respective one of the welding laser beam sources and is directed at the respective associated edge area of the weld butt at an incidence angle and then moved along the weld butt in a welding direction to form the weld seam at a weld speed. Thereby, each respective welding laser beam source is located generally next to the vertical side surface of the first component and laterally next to and above the respective edge of the weld butt joint area. Further according to the invention, the actual value of the seam flank angle of the weld seam being formed is optically sensed or detected by the sensor arrangement that moves along with the welding laser beam source at the welding speed, and this actual value information is converted into a signal representing corresponding sensor information, which is then provided from the sensor arrangement to the seam position regulating arrangement. Next, the seam position regulating arrangement compares the received sensor information with an externally provided nominal or desired value information or an internally stored nominal or desired value information. Then, the seam position regulating arrangement determines a comparison result information from the result of the comparison of the actual and desired value informations. Based on this comparison result information, the seam position regulating arrangement generates a regulating value, which is then provided to the seam position component. Then, the seam position component carries out a correction of the position respectively of the two welding laser beam sources through a moving adjustment or variation of the laser beam sources from their initial starting positions in respective corrective axis directions in three-dimensional space, whereby the entry and penetration position of the individual laser beams into the edge area of the weld butt joint is varied so as to consequently vary the seam flank angle resulting thereby, whenever and to the extent that a deviation of the sensor-detected actual information from the nominal or desired value information arises in the determination of the comparison result information in the seam position regulating arrangement.

BRIEF DESCRIPTION OF THE DRAWINGS

In order that the invention may be clearly understood, it will now be described in detail in connection with an example embodiment, with reference to the accompanying drawings, wherein.

DETAILED DESCRIPTION OF A PREFERRED EXAMPLE EMBODIMENT AND OF THE BEST MODE OF THE INVENTION

Generally, the present example embodiment relates to the laser weld joining of a stringer 11 as a first component that is butted and joined onto a flat sheetmetal shell component 10 as a second component, by means of two laser weld seams 13, 131 on opposite sides of the weld butt joint or weld butt 12, to form a welded component. Such a welded component, representing a stringer-stiffened shell component, is, for example, used in aircraft construction, and in the future will find ever-increasing use in the construction of aircraft fuselages. In this regard, it will be necessary to improve the weld seam quality and reduce the reject rate of laser welded components, while also avoiding the additional effort, cost and time expenditure of re-working and re-welding any rejected components having sub-standard quality of the finished weld seams. These improvements and others are achieved according to the invention using the apparatus and the method for regulating the seam position NL of a laser welded component according to the invention.

Figure 1:
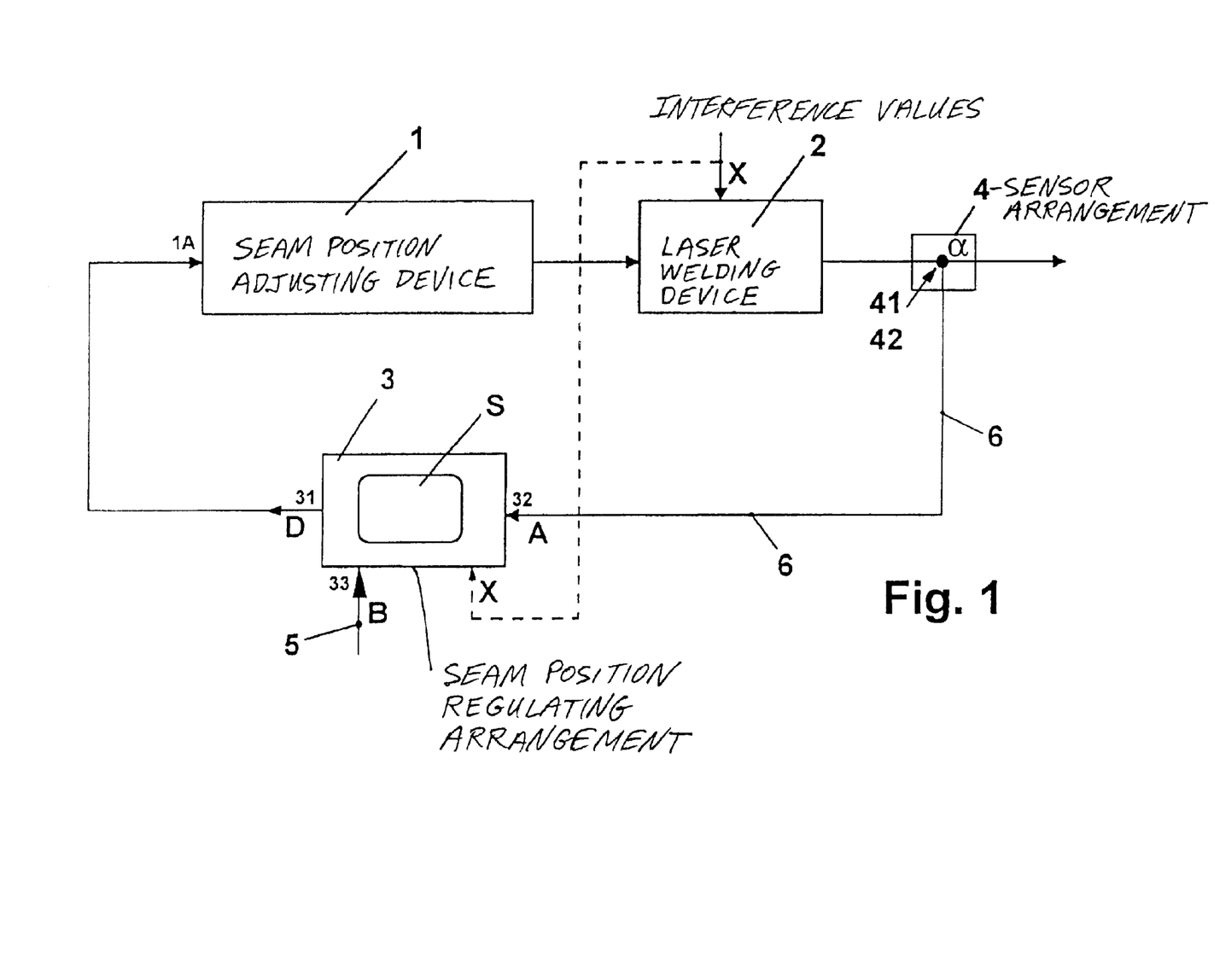
FIG. 1 is a schematic block circuit diagram of an apparatus for regulating the seam position of a laser weld seam on a laser-welded stringer-stiffened flat sheetmetal shell component.

As a general overview of the inventive apparatus or system, the block circuit diagram of FIG. 1 shows the apparatus for regulating the seam position NL of the stringer-stiffened flat sheetmetal shell 10, which will be used to influence, e.g. vary and thereby correct, the seam position NL of the laser weld seams 13, 131 by which the two components 10 and 11 are to be connected to each other on the two opposite edges of the weld butt 12, by appropriately regulating and thus correspondingly achieving a resulting seam flank angle $\alpha$ of the laser weld seams 13, 131 lying within the acceptable tolerance ranges.

Figure 3:
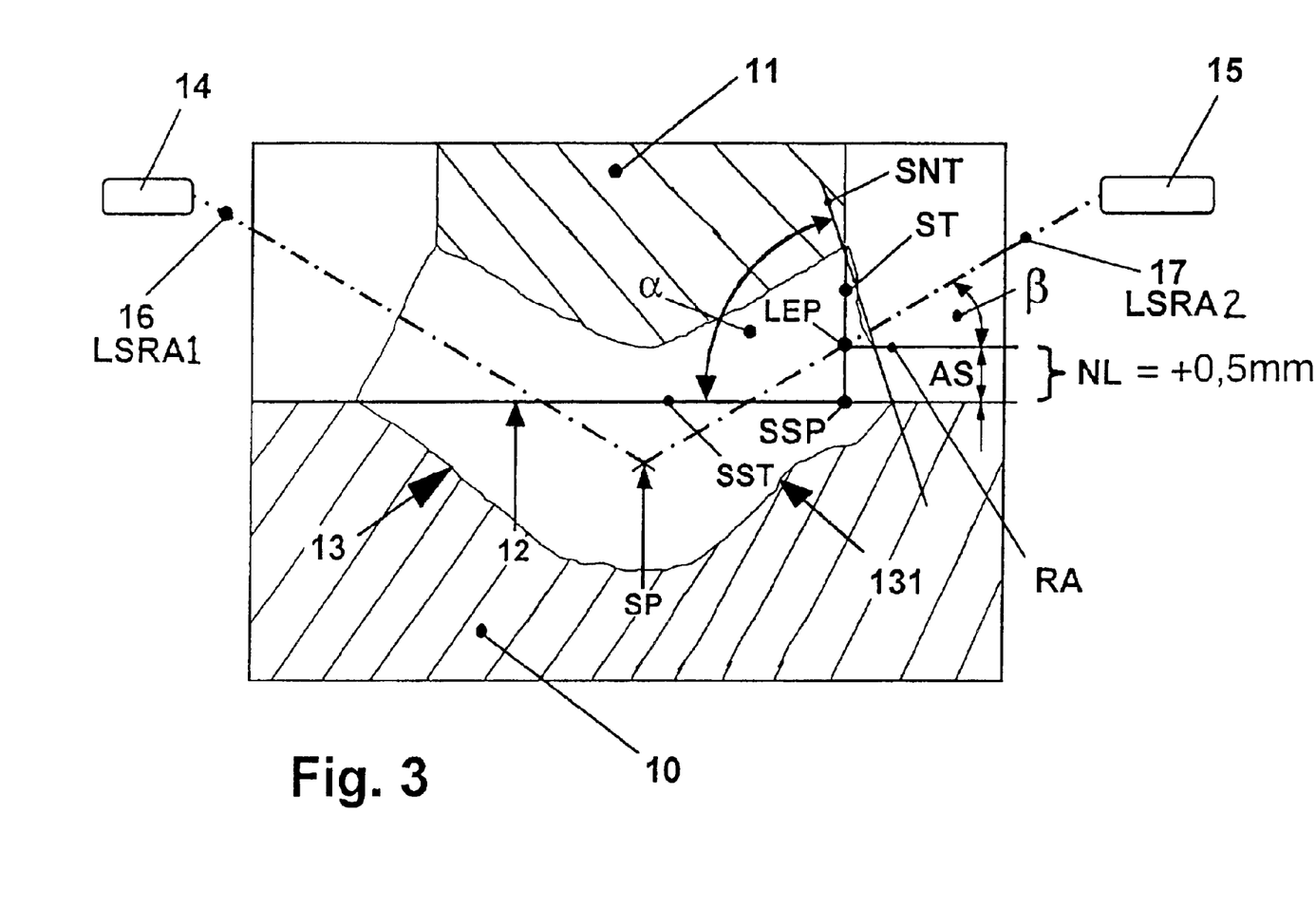
FIG. 3 is an enlarged detail sectional view of the area of the laser welded butt joint of the laser welded components.

Before describing the functions of the various components of the apparatus of FIG. 1 in detail, first the geometry of the area of the laser welded joint, as shown in FIG. 3, will be described. FIG. 3 shows a stringer 11 positioned vertically and thus at a right angle on a flat sheetmetal shell 10. Thereby, the edge surface of the stringer 11 butts onto the top surface of the flat sheetmetal shell 10, whereby a weld butt joint or weld butt 12 is formed along the contacting surfaces of these two components 10 and 11. The stringer 11 embodies an angle profile member that is used to achieve the additional local stiffening or strengthening of the flat sheetmetal shell 10 in the field of aircraft construction. On the other hand, the flat sheetmetal shell 10 embodies a skin field or section of the outer skin of an aircraft fuselage, which is stiffened by the stringer profile 11 welded thereon in order to better withstand the pressure and sheer loads that will be exerted on the shell 10 in its final application.

Two welding laser beam sources 14 and 15 are respectively arranged to the left and to the right of the stringer 11, and respectively generate and emit the linearly directed laser beam 16 and 17, that is oriented toward the respective edge or rim of the weld butt 12 of the two components 10 and 11 for forming the intended weld seam or weld joint between the two components. Particularly, a first welding laser beam source 14 is arranged to the left of the stringer 11, and emits a first laser beam 16 that is directed along the laser beam direction axis LSAR1 to the left edge of the weld butt 12 to form a first laser weld seam 13, whereby the light energy content of the laser beam 16 penetrates into a lower area of the laser weld seam 13, namely the seam root, along which no further melting of the metal material of the stringer 11 and/or the skin sheet 10 will arise due to the lack of sufficient heating at this boundary. Similarly and simultaneously, a second laser beam source 15 is arranged to the right of the stringer 11, and emits a second laser beam 17 that is directed along the linear laser beam direction axis LSAR2 to impinge along the right edge of the weld butt 12 to form a second laser weld seam 131, with similar effects as described above in connection with the first laser weld seam 13.

The penetration depth of the two laser beams 16 and 17 intersects and effectively ends at a predefined weld point SP, of which the welding effect will begin at an upper area of the respective associated laser weld seam 13, 131 and end at the lower seam root as discussed above. In this context, the two laser beams 16, 17 respectively are each incident at a prescribed beam incidence angle β>0°, which is measured between the central axis LSRA1, LSRA2 of the respective laser beam 16, 17 and the plane of the upper surface of the sheetmetal shell 10, or correspondingly along a plane of a weld butt tangent SST that lies along the plane of the surface of the sheetmetal shell 10 and the original edge surface of the butted stringer 11.

According to the invention, the position (which can mean not only the location, but also the orientation) of a laser beam head representing or integrated in the welding laser beam source 14, 15 respectively, from which the respective individual laser beam 16, 17 is emitted, can be adjusted. Thereby, one can carry out a regulated correction of the position (i.e. the location and the orientation) of the two laser beam sources 14, 15 through a spatial variation or adjustment from the initial starting positions thereof in varied axis directions in three-dimensional space. This achieves a simultaneous variation or adjustment of the beam incidence angle β of the individual laser beams 16, 17 as well as the penetration positions of the laser beams into the respective edge region of the weld butt 12, so as to achieve a variation of the resulting seam flank angle α.

To provide a background understanding of the subsequent discussion, a definition of the seam position NL and of the associated seam flank angle α will now be provided. This will facilitate the subsequent discussions relating to the regulation of the seam position NL and the corresponding influence on the seam flank angle α.

Referring to the cross-sectional view of FIG. 3, the seam position NL is generally defined by the spacing distance AS between the plane of the original upper surface of the sheetmetal shell 10 and the penetration or intersection point of the laser beam 16 or 17 along the plane of the original side surface of the stringer 11, e.g. referring to the planes of these surfaces as they existed before the welding operation. To picture this in connection with the cross-section as it exists after the welding operation has been carried out, certain explanatory planes or tangent lines are additionally illustrated in FIG. 3. Particularly, the weld butt tangent SST extends along the plane of the original surface of the flat sheetmetal shell 10, which also represents the plane of the original edge butt joint of the stringer 11 against the sheetmetal shell 10. A stringer tangent ST extends along the plane of the side surface of the stringer 11, and represents the extension of that surface as it existed before the welding operation. The weld butt intersection point SSP represents the intersection of the stringer tangent ST and the weld butt tangent SST, which would correspond to the intersection of the side surface of the original stringer 11 and the top surface of the original sheetmetal shell 10 before the welding operation. The laser beam entry point LEP represents the point of intersection of the beam axis LSRA2 of the laser beam 17 with the stringer tangent ST, i.e. which would correspond to the point of entry of the laser beam 17 into the side surface of the original stringer 11. Then, the spacing distance AS is the distance measured from the weld butt intersection point SSP to the laser beam entry point LEP along the stringer tangent ST. This measured spacing distance AS gives the seam position NL.

The laser beam 17 is incident into the laser weld seam 131 at the beam incidence angle β, which is the angle between the plane of the surface of the flat sheetmetal shell 10 and the laser beam direction axis LSRA2 of the laser beam 17. This angle β can also be measured between the axis LSRA2 of the laser beam 17 and a direction axis RA that extends parallel to the plane of the surface of the flat sheetmetal shell 10 and thus also parallel to the weld butt tangent SST, at the elevation of the laser beam entry point LEP, i.e. intersecting the stringer tangent ST at the laser beam entry point LEP.

When a further tangent line, namely the weld seam tangent SNT is extended from the edge of the finished weld seam along the stringer tangent ST to the edge of the finished weld seam along the weld butt tangent SST, thereby the seam flank angle α is defined as the internal angle of the weld seam between this weld seam tangent SNT and the weld butt tangent SST.

In connection with the above discussion, the angular value of the above mentioned angles as well as the position of the above mentioned tangent lines can be determined through the use of suitable trigonometric functions and/or by calculation of the associated circular arcs. Also note that the discussion and illustration of these features with respect to the right side weld seam 131 and the right laser beam 17 apply equally in a mirror-image with respect to the left weld seam 13 formed by the left laser beam 16.

Figure 4:
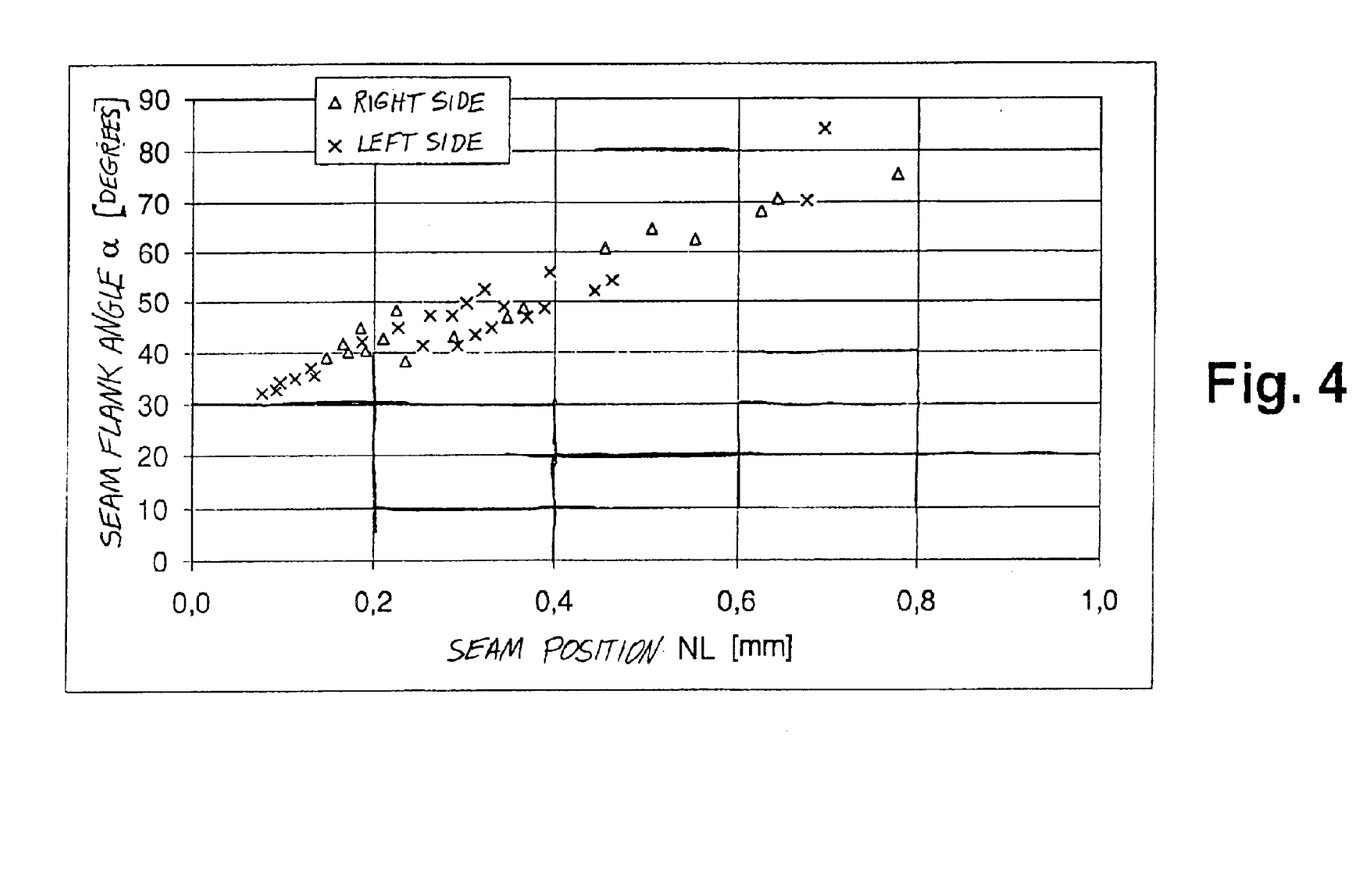
FIG. 4 is a graphical diagram showing the interdependence of the seam flank angle $\alpha$ and the seam position NL.

Now with reference to FIG. 4, it has been determined that there is a dependency between the resulting seam flank angle α and the resulting seam position NL. The values of the seam flank angle α and the corresponding seam position NL shown in FIG. 4 were measured under actual practice conditions of laser welded seams (with an "x" symbol for measurements on the left side seam and a "Δ" symbol for measurements on the right side seam). These values show a clear proportional relationship or dependency of the seam flank angle α with respect to the seam position NL and vice versa. Based on recognition of this proportionality, the invention develops the object of adjusting the position, i.e. the location and the orientation, of the laser beam source 14, 15 for correspondingly adjusting the incidence angle β and the laser beam entry point LEP of the laser beam 16 or 17 impinging onto the components to be welded, to thereby vary or adjust the resulting seam flank angle α and the associated seam position NL. Particularly, it is particularly preferred and advantageous to achieve a seam flank angle α in the tolerance range from 40° to 50°, or correspondingly a seam position NL of approximately +0.5 mm.

Now returning to the block circuit diagram of FIG. 1, the apparatus for regulating the seam position NL of a stringer stiffened flat sheetmetal shell 10, comprising several system components that are connected to each other in an information technology manner, namely for data transmission, in series in a regulating loop, will now be discussed. The system components include an integrated seam position regulating arrangement 3, a seam position component 1 for adjusting the seam position NL, and a laser welding process component 2 with two integrated welding laser beam sources 14, 15 for achieving the individual laser weld seams 13, 131, which are connected in series with one another via suitable information conductor lines. The seam position regulating arrangement 3 is embodied with a regulator or controller that is particularly an electronic one-way controller or regulator embodied as a proportional action controller or regulator.

Furthermore, a sensor arrangement 4 is integrated into the apparatus, and is secured directly on or near to the laser welding process component 2. Particularly, the sensor arrangement 4 comprises two sensors 41, 42 which are respectively positioned to the left and to the right side of the cross-section of the stringer 11, as seen in the view of FIG. 3. The sensors 41, 42 are particularly optical sensors, which, for example comprise light section sensors. The sensor arrangement 4, or particularly the sensors 41, 42, are arranged and secured in such a manner so that the sensors 41, 42 are arranged on or at least coupled so as to move along with the horizontally moving welding laser beam sources 14, 15 respectively, in a synchronous and following manner at the welding speed along the weld joint. This also explains the position of the sensors 41, 42 next to and near the individual laser weld seams 13, 131, or next to the weld butt 12 on opposite sides thereof, so that the respective sensor head of each sensor 41, 42 is oriented to monitor or sense the associated laser weld seam 13, 131 in order to optically detect or sense the geometry, e.g. the geometric image, of the individual laser weld seam 13, 131 along the edge of the weld butt 12 as it is being formed.

The general operation and functioning of the individual optical sensors 14, 15 especially embodied as light section sensors, i.e. so-called Falldorf sensors, are generally known to persons of skill in this art, for example, based on the sensors available from the Falldorf & Co. GmbH company mentioned above. Therefore, the details thereof will not be described herein to the extent they are known to persons of skill in the art. Furthermore, it is generally known how to use such sensors for carrying out a geometrical sensing and measuring of weld seams with the generally known light section method, and which may especially be used for the optical detection of the quality-determinative weld seam properties such as the parametric evaluation of the surface profile of the weld seam, for example with respect to a seam collapse, seam edge positions, seam offset, and the like.

Any of such known processes and evaluated parameters can be used in connection with the present invention. Particularly for the preferred inventive purposes, the sensors 41, 42 of the sensor arrangement 4 realize the optical detection of the weld seam flank angle α and, if applicable, the seam position NL, and then transform the results of the optical measurements into a converted signal representing sensor information A, which is transmitted via a common shared information line 6 to a first input 32 of the seam position regulating arrangement 3 that is connected to the information line 6.

Figure 2:
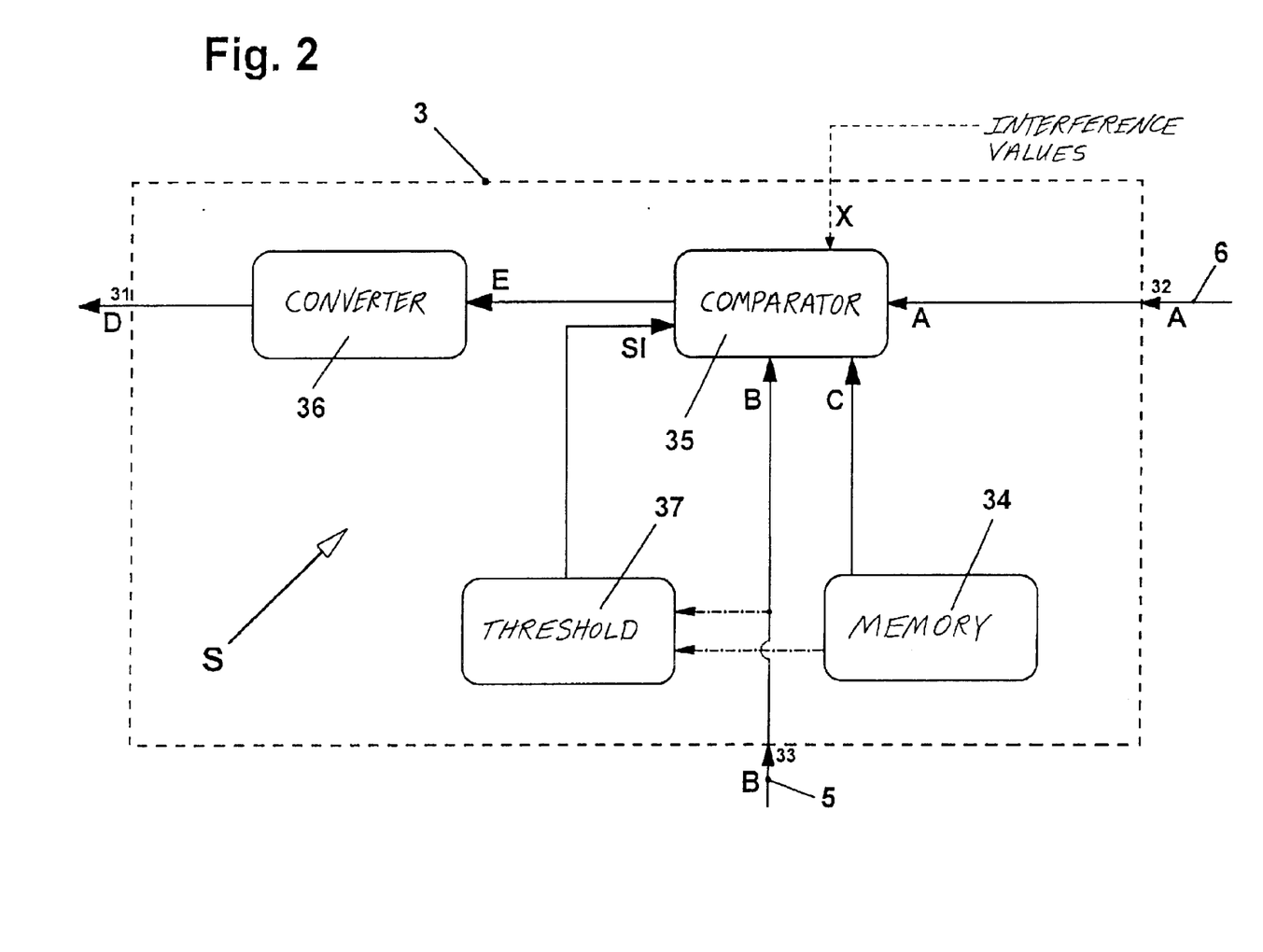
FIG. 2 is a schematic block circuit diagram of the circuit of the seam position regulating arrangement forming one of the components of the apparatus shown in FIG. 1.

The seam position regulating arrangement 3 is internally equipped with a circuit S as shown in FIG. 2. The circuit S comprises several circuit components which are functionally interconnected with one another. Due to this functional interconnection of the individual circuit components, the circuit S is capable and adapted to carry out an information comparison of the sensor informations A that were determined externally from the circuit and are continuously provided to the circuit during a welding process, on the one hand, with a nominal or desired value information B relating to the desired seam flank angle α, on the other hand. Then, from the comparison result, the circuit generates a regulating value D for the variation or adjustment of the seam flank angle α, which is provided at the output 31 of the seam position regulating arrangement 3 and then provided to the seam position component 1 for adjusting or varying the seam position NL.

The functioning of the circuit S will now be described in further detail in connection with FIG. 2, to be understood together with the explanation of the overall apparatus according to FIG. 1. Particularly, FIG. 2 shows an arrangement of several circuit components and their functional interconnection, making up the circuit S. Namely, the circuit S comprises a comparator component 35, a memory or storage component 34, a converter component 36, and an optionally or selectively arranged threshold value component 37. The threshold value component 37 is primarily integrated in the circuit S for reasons of reliably providing a nominal or desired value information regarding the desired seam flank angle α that is to be compared with the above mentioned sensor information A representing the actual measured value information regarding the seam flank angle α. Through the use of this threshold value component 37, a stored nominal or desired value information C can be called up and used instead of the nominal or desired value information B in situations of interference or interfered operating conditions during the performance of the welding, in order to still achieve a seam flank angle α within the required tolerance range under such conditions in which the actual measured information might by missing or faulty.

The input of the comparator component 35 is connected with the above mentioned first input 32 of the seam position regulating arrangement 3, through which the comparator component 35 receives the above mentioned actual measured sensor informations A from the shared or common information line 6.

Furthermore, an external information line 5 is connected to a second input 33 of the seam position regulating arrangement 3, which is similarly connected to a further input of the comparator component 35. Via this external information line 5, a circuit-external supplied nominal or desired value information B regarding the desired seam flank angle α is supplied to the comparator component 35 in the normal case, i.e. under normal operating conditions without interference. Additionally, a third input of the comparator component 35 is connected to the memory component 34, which supplies a circuit-internal stored nominal or desired value information C from the memory component 34 to the comparator component 35 only in abnormal conditions, i.e. after the failure or interference of the external information line 5 and thus a corruption or omission of the externally supplied nominal or desired value information B.

The threshold value component 37 is able to determine the correct value range or information content of the nominal or desired value information B through a comparison thereof with a suitable stored threshold value. Once the threshold value component 37 has determined that the provided nominal or desired value information is available, it will release or connect through the direct information path via the externally supplied information line 5 to the comparator 5.

On the other hand, if the threshold component 37 determines that the externally supplied nominal or desired value information B falls below the stored suitable threshold, this signals that there is an interference or omission or failure of the externally supplied information B, which is signaled to the comparator component 35 by a threshold value information SI provided to a further input of the comparator component 35, to signal or inform the comparator component 35 that the nominal or desired value information B is missing, corrupted by interference, or the like.

Consequently upon receiving the above mentioned threshold value information SI, the comparator component 35 will request or call up the stored or fixedly prescribed nominal or desired value information C from the memory component 34. Whenever one of the two nominal value informations B or C is available to the comparator component 35, it will carry out a comparison of the sensor-measured actual informations A that have been provided to it during a welding process with the corresponding nominal value informations B or C. The determined result of this desired value versus actual value comparison is summarized or expressed in a comparison result information E, which is provided from the comparator component 35 to a converter component 36 via a suitable line connected therebetween. Then, the converter component 36 will convert the comparison result information E into a corresponding control or regulating value D, i.e. will generate the regulating value D for the seam flank angle $\alpha$ based on the received comparison result information E. The generated regulating value D is then made available to be called up at an output 31 of the seam position regulating arrangement 3. This output 31 is connected to the output of the converter component 36.

As mentioned above, the threshold value component 37 is optional in that it can be omitted if it is not considered important to carry out its interference detection function. Without such a threshold value component 37, it will not be possible to detect an interference, omission, or other fault of the externally supplied nominal or desired value information B, so as to substitutionally provide the internally stored nominal or desired value information C. Instead, the nominal or desired value information B will simply always be provided directly to the comparator component 35, whenever the external information B is available.

It is further possible to detect or measure other external interfering influences to provide corresponding converted signals representing interference value informations X, for example relating to the warping of the component, a tipping of the stringer 11 on the flat sheetmetal shell 10, or other interference informations derived from other external system components of the welding system being used. Such additional interference informations X can be additionally provided to the comparator component 35 through an external conductor line connected thereto, to be further taken into consideration by the comparator component 35 in the internal evaluation or comparison of the informations. This interference value information X generally is provided to the laser welding process component 2 (according to FIG. 1), which responsively thereto blocks the initiation of the laser welding process or immediately terminates the laser welding process if it is already in progress. Similar considerations and functions would be carried out by the comparator component 35 upon receiving this interference information X.

Now returning to the block circuit diagram of FIG. 1, the input 1A of the seam position component 1 is connected for data exchange with the output 31 of the seam position regulating arrangement 3. Via this conduction line, the circuit-generated regulating value D for the adjustment or variation of the seam flank angle $\alpha$ is provided to the seam position component 1.

Responsive thereto, the seam position component 1 will carry out an adjustment or variation of the seam position NL, in an information technical manner, i.e. by information or data processing means, whereby it forms and then provides to the laser process component 2 an actuating information based on the provided regulating value D, whereby this actuating information serves for the local variation or adjustment of the main axes, possibly while further utilizing additional auxiliary axes, on which the welding laser beam sources 14, 15 of the laser process component 2 are moved. As a result, the laser process component 2, as already indicated with regard to FIG. 3, effectuates a position variation or adjustment of the local position of the welding laser beam sources 14, 15 or their laser emitting heads, whereby, due to the varied or adjusted position of the laser emitting heads, the first and second laser beams 16, 17 of the first and second laser beam sources 14, 15 will impinge upon and penetrate into the workpiece components at a changed or varied beam incidence angle $\beta$ and/or at a different laser beam entry point LEP. The welding process will continue to be carried out as described above, whereby the changed beam incidence angle $\beta$ or beam entry point LEP will also bring about a change of the seam position NL of the respective associated laser weld seam 13, 131 as the welding process progresses.

The above adjustments can be carried out generally to achieve the aim of holding the seam flank angle $\alpha$ constant despite arising interfering influences with relatively small interference values, such as the position tolerance of the laser beam, tolerances of the tactile sensor for detecting the weld butt 12, torsion and bending deformation of the stringer 11 during roll guidance thereof, etc.

In this context, it becomes necessary that the above described optical sensors 41, 42 must be arranged as close as possible to the laser weld seams or beads 13, 131 being drawn, in order to completely and quickly, as well as accurately, detect the geometric image of the respective laser weld seam 13, 131.

The inventive method for regulating the seam position NL of a stringer stiffened flat sheetmetal shell 10 is carried out with the above described apparatus according to FIGS. 1 and 2, whereby the two components 10, 11 to be welded are positioned with the butt joint as shown in FIG. 3. In this regard, the edge surface of the stringer 11 is arranged perpendicularly and in the weld butt 12 on the upper surface of the flat sheetmetal shell 10, after these components have been prepared as necessary (e.g. cleaning etc.) for carrying out the subsequent laser welding process. Before actually carrying out the laser welding, the method begins with an initial adjustment of the position respectively of the two welding laser beam sources 14, 15. This adjustment can be based on an initial optical measurement of the weld butt 12 with a corresponding correlated regulating value D for the variation or adjustment of the seam flank angle $\alpha$ by the seam position component 1. Then, on the basis of this regulating value D, the laser beams 16 and 17 are generated and emitted by the beam sources 14 and 15 and are moved along the joint in the welding direction so as to continuously form the laser weld seams 13, 131 on the two opposite sides along the edge of the weld butt 12 to join the stringer 11 and the flat sheetmetal shell 10 to form thereof a single laser welded part.

The respective laser beam 16, 17 emitted by each respective laser beam source 14, 15 is directed at a respective beam incidence angle β onto the side edge area of the weld butt 12. The laser beam sources 14, 15 are moved at the selected welding speed along the stringer cross-section respectively on opposite sides thereof, as shown in FIG. 3.

During the progress of the laser welding, the regulating or adjustment method of a preferred embodiment of the present invention is carried out, with the following steps a), b), and c).

In a first step a), the actual value of the seam flank angle α is optically detected by the sensor arrangement 4 that runs or moves along with the laser beam sources at the welding speed. The detected actual value of the seam flank angle α is converted by the sensor arrangement 4 into a signal providing a sensor information A, which is transmitted from the sensor arrangement 4 to the seam position regulating arrangement 3.

In a second step b), the received sensor information A is compared by a comparator component 35 of the seam position regulating arrangement 3, with an externally provided nominal or desired value information B or an internally stored nominal or desired value information C respectively relating to the desired seam flank angle α, which are respectively provided via the external information line 5 directly connected to the comparator component 35 or via the memory component 34 that is optionally integrated in the seam position regulating arrangement 3 as described above. Based on the comparison of these informations, the comparator component 35 determines a comparison result information E, which is then transformed to generate the corresponding regulating value D by a converter component 36 of the seam position regulating arrangement 3 connected to the comparator component 35. This regulating value D is then transmitted to the seam position component 1.

Next, in a third step c), the seam position component 1 generates and provides an adjusting or actuating value corresponding to the comparison result information E to the laser welding process component 2, which then responsively thereto carries out a correction of the local position of the two laser beam sources 14, 15 by correspondingly adjusting the positions of the laser emitting heads of the laser beam sources 14, 15. In this context, the initial positions of the laser beam sources 14, 15 are changed or adjusted in appropriate corrective axis directions in three-dimensional space in such a manner that simultaneously and correspondingly the beam incidence angle β of the individual laser beams 16, 17 and the entry and penetration position LEP thereof in comparison to the initial position into the side edge portion of the weld butt 12 is varied or adjusted in a corrective manner to achieve a corresponding change or adjustment of the resulting seam flank angle α, to the extent that the above described comparison determined a deviation of the sensor information A from the nominal or desired value information B or C in the determined comparison result information E. The particular use, function and operation of the threshold value component 37, which is optionally integrated into the seam position regulating arrangement 3 to the extent that one utilizes, i.e. does not omit, the memory component 34, has been fully described above.

Further particular details and embodiment features of the invention will now be described to supplement the above general features of the invention, for example as follows. As mentioned above, after the components to be welded have been properly positioned, and before the beginning of the laser welding process itself, the position and arrangement of the weld butt 12 is sensitively optically detected using the sensor arrangement 4, from which values are prescribed, from which in turn the supplied or stored nominal or desired value informations B, C are derived. Furthermore, the various interference value informations X, which arise during the laser welding process and which have an influence on the laser welding process and especially also on the actual value of the resulting weld seam flank angle α, are provided to the seam position regulating arrangement 3, and are utilized instead of the signal-converted sensor information A for comparison with the nominal or desired value informations B, C if the sensitive detection of the actual seam flank angle α fails during the laser welding process. Further, it is provided that the variation or adjustment of the beam incidence angle β and/or the beam entry point LEP of the individual laser beams 16, 17 leads to achieving a seam flank angle α through the welding process that has an angle range tolerated between 40° and 50°.

It is further provided that the seam position NL is determined through the sensitive detection of the spacing distance AS, which is measured along the above described vertical stringer tangent ST in connection with the further tangents and points described in connection with FIG. 3. The resulting seam position NL will amount to approximately +0.5 mm. Furthermore, the resulting seam flank angle α is measured through the sensitive detection of the tangent positions of the weld seam tangent SNT and the weld butt tangent SST as described above in connection with FIG. 3, and then further through calculation of the circular arc or by means of trigonometric functions. Similarly, the beam incidence angle β of each one of the respective laser beams 15, 16 is measured by sensitively detecting the axis position of the respective laser beam direction axis LSRA1, LSRA2 relative to the direction axis RA as described above in connection with FIG. 3, and then further through calculation of the circular arc or according to trigonometric functions.

A simplified summary of the above descriptions follows. Previously in the known art, so-called light section sensors or Falldorf sensors have been used in conventional laser welding processes in order to detect the butt joint between the two parts that are to be welded, but before the welding process is carried out, or to monitor the resulting laser weld seam of the laser welded parts with respect to the surface geometry thereof after completion of the welding process. Such known processes, however, do not allow for the correction or adjustment of the welding laser beam position during the welding operation so as to influence or control the formation of the resulting parameters of the laser weld seam and particularly the seam position and the seam flank angle. The invention is based on a substantially different concept, whereby the position of each respective welding laser beam source is regulated during the welding process through the use of the information provided by the detected or measured surface geometry of the laser weld seam or bead being drawn. Through this regulation, an improvement of the surface geometry and especially of the seam flank angle α of the resulting laser weld seam is achieved. This is sensible and useful, because the surface geometry and particularly the seam flank angle α thereof represent an essential starting parameter or basic value of the laser welding process. In this context, the invention provides that the light section sensor is arranged directly behind the laser welding process, i.e. directly following the laser weld seam as it is formed. The inventive apparatus and method then generate a characteristic value for the regulation of the position of the welding laser beam source based on the measured geometry of the laser weld seam directly after it is formed. Thereby, the position regulation of the welding laser beam source is carried out on the basis of the achieved seam geometry and particularly the detected actual seam flank angle α and the correlated seam position NL.

The inventive solution is achieved by means of the above described regulation of the seam position NL dependent on the seam flank angle α that is measured directly after the welding, i.e. directly following the progressing weld point during the welding operation, on the laser weld seam that has just been formed. This is possible because a systematic and linear correlation or proportionality exits between the input value of the seam position NL and the output value of the seam flank angle α. To achieve the required adjustment or variation of the seam flank angle α and the correlated seam position NL, each welding laser beam source is movable or adjustable in its position along corresponding auxiliary axes so as to carry out the positional and orientation adjustment of the laser beam emitted from the respective laser beam source to the weld joint area. With the inventive apparatus and method, the following advantages are achieved, whereby the expenditure of effort, time and costs for any required re-working or re-welding of previously formed laser weld seams if the resulting seam flank angle α lies outside of the acceptable tolerance range, will be avoided. Namely, re-working and re-welding of unacceptable quality seams will no longer be necessary. The resulting workpiece quality of the welded components will be increased by achieving only small fluctuations of the seam flank angle α. Consequently also, the reject rate of the resulting welded parts will be reduced through this regulated laser beam welding process, which can be used for welding new parts as well as re-welding previously welded rejected parts.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The laser welding process component 2 may comprise any conventional laser welding device, for example including one or more laser beam sources 14, 15. The sources 14, 15 may comprise laser beam generators alone, or additionally mirrors or optical devices for redirecting the laser beams. Thus, moving or adjusting the laser beam source can mean moving or adjusting the actual laser beam generator, and/or moving or adjusting any mirrors or optical devices used for redirecting the laser beam at the intended weld point. The seam position component 1 comprises an adjusting device that includes an actuator arrangement of one or more conventionally known drives or actuators of any known type, for carrying out the multi-axis adjustment of the location and/or orientation of the laser beam sources 14, 15 (i.e. the beam generators and/or mirrors or optical components) relative to the joint to be welded. A welding direction extends along the joint to be welded, and the laser beam sources move along the welding direction to draw the weld bead forming the weld seam along the weld joint. The "joint" refers to the area along and around the e.g. butted meeting of the two workpieces, which will ultimately be filled with (and/or converted to) the weld metal to form the welded joint. The one or more sensors are coupled mechanically or electronically to the laser welding device so as to move along with or following the motion of the laser beam sources. In other words, this does not require a direct mechanical connection, but could alternatively be achieved with a suitable electronic guidance and control of the motion of the sensors dependent on or linked to the motion of the laser beam sources.

What is claimed is:

1. A regulated laser welding apparatus for laser welding a first workpiece and a second workpiece to join the workpieces along a joint, said apparatus comprising:

a laser welding device including a laser beam source arranged to be movable in a welding direction along said joint of said workpieces, wherein said laser beam source is further movable with respect to at least one of a location and an orientation thereof relative to said joint of said workpieces, and wherein said laser beam source is adapted to emit a laser beam directed at a weld point on said joint of said workpieces so as to form a weld seam therealong to join said workpieces;

a sensor arrangement including a sensor arranged on or near said laser welding device and coupled to said laser welding device so as to move together with or following said laser beam source in said welding direction along said joint of said workpieces, wherein said sensor is directed at said weld seam formed by said laser beam along said weld joint so as to detect actual seam information characterizing at least one of an actual seam position and an actual seam flank angle of said weld seam that is actually formed by said laser beam;

a weld seam position regulating arrangement that is connected to said sensor arrangement so as to receive said actual seam information, and that includes a regulating circuit adapted to carry out a comparison of said actual seam information with nominal desired seam information characterizing at least one of a desired seam position and a desired seam flank angle of said weld seam that is to be produced, and to generate a regulating value based on a result of said comparison; and an adjusting device that is connected to said weld seam position regulating arrangement so as to receive said regulating value, and that includes an actuator arrangement coupled to said laser welding device and adapted to adjust at least one of said location and said orientation of said laser beam source relative to said joint of said workpieces in response to and dependent on said regulating value.

2. The apparatus according to claim 1, wherein said actual seam information characterizes said actual seam flank angle, and said nominal desired seam information characterizes said desired seam flank angle.

3. The apparatus according to claim 1, wherein said actual seam information characterizes said actual seam position, and said nominal desired seam information characterizes said desired seam position.

4. The apparatus according to claim 1, wherein said weld seam position regulating arrangement includes an external input connected to said regulating circuit and adapted to receive an externally supplied seam information as said nominal desired seam information.

5. The apparatus according to claim 4, wherein said regulating circuit further comprises a memory storing an internal stored seam information as said nominal desired seam information.

6. The apparatus according to claim 5, wherein said regulating circuit further comprises a threshold evaluating component that is connected to said external input so as to receive said externally supplied seam information and to said memory so as to receive said internal stored seam information, and that is adapted to carry out an evaluation of said externally supplied seam information relative to a threshold value, and to selectively provide either said externally supplied seam information or said internal stored seam information as said nominal desired seam information in response to and dependent on a result of said evaluation.

7. The apparatus according to claim 1, wherein said regulating circuit further comprises a memory storing an internal stored seam information as said nominal desired seam information.

8. The apparatus according to claim 1, wherein said regulating circuit comprises a comparator that receives said actual seam information and said nominal desired seam information and carries out said comparison thereof.

9. The apparatus according to claim 8, wherein said regulating circuit further comprises a converter component that receives said result of said comparison from said comparator and generates therefrom said regulating value.

10. The apparatus according to claim 1, wherein said sensor comprises a sensor head positioned proximate to said weld seam and oriented with a sensing axis thereof directed at said joint.

11. The apparatus according to claim 1, wherein said laser beam source is a first laser beam source forming said weld seam as a first weld seam, said laser welding device further comprises a second laser beam source, said first and second laser beam sources are arranged respectively on opposite sides of said first workpiece, said second laser beam source is adapted to emit a second laser beam directed at said weld point on said joint so as to form a second weld seam therealong on an opposite side of said first workpiece relative to said weld seam formed by said laser beam emitted by said first laser beam source, said sensor is a first sensor, said sensor arrangement further comprises a second sensor, said first and second sensors are arranged respectively on said opposite sides of said first workpiece, said second sensor is arranged on or near said laser welding device and coupled thereto so as to move together with or following said second laser beam source in said welding direction along said joint of said workpieces, and said second sensor is directed at said second weld seam.

12. The apparatus according to claim 11, further comprising a common data line connected to both of said sensors and to said weld seam position regulating arrangement.

13. The apparatus according to claim 1, wherein said sensor is an optical sensor.

14. The apparatus according to claim 1, wherein said sensor is a light section sensor that optically detects a geometry of said weld seam to provide said actual seam information.

15. The apparatus according to claim 1, wherein said weld seam position regulating arrangement comprises a proportional or differential one-way regulator.

16. A method of laser welding a first workpiece and a second workpiece to join the workpieces along a joint, comprising the steps:
a) arranging said first workpiece and said second workpiece to be joined along said joint therebetween;
b) emitting a laser beam from a laser beam source and directing said laser beam at a weld point on said joint;
c) moving said laser beam source in a welding direction along said joint to thereby move said weld point along said joint so as to form a weld seam therealong to join said workpieces;
d) during said step c), using an optical sensor, optically sensing actual seam information characterizing at least one actual value of at least one physical geometric parameter of said weld seam;
e) comparing said actual seam information with nominal desired seam information characterizing at least one nominal desired value of said at least one physical geometric parameter of said weld seam, to produce a comparison result;
f) when said comparison result indicates an unacceptable deviation of said actual seam information from said nominal desired seam information, then adjusting at least one of a location and an orientation of said laser beam source to a new adjustment relative to said joint, dependent on and responsive to said comparison result, and continuing or repeating said steps c), d) and e) with said new adjustment of said laser beam source.

17. The method according to claim 16, wherein said at least one physical geometric parameter of said weld seam comprises a weld seam flank angle of said weld seam.

18. The method according to claim 17, wherein said nominal desired value of said weld seam flank angle is in a range from 40° to 50°, and wherein said steps c), d), e) and f) are carried out so that said actual value of said weld seam flank angle is maintained in or brought into a range from 40° to 50°.

19. The method according to claim 17, wherein said step d) comprises optically detecting a surface tangent plane of a surface of said second workpiece and a weld seam tangent that passes through a first intersection of a surface of said weld seam with a surface of said first workpiece and a second intersection of said surface of said weld seam with said surface of said second workpiece, and said step c) further comprises determining said actual value of said weld seam flank angle as an angle enclosed between said surface tangent plane and said weld seam tangent.

20. The method according to claim 16, wherein said at least one physical geometric parameter of said weld seam comprises a seam position of said weld seam.

21. The method according to claim 20, wherein said nominal desired value of said seam position is in a range from +0.3 mm to +0.5 mm, and said steps c), d), e) and f) are carried out so that said actual value of said seam position is maintained in or brought into a range from +0.3 mm to +0.5 mm.

22. The method according to claim 20, wherein said step d) comprises optically detecting a laser beam entry point at which said laser beam penetrates into said first workpiece on a surface of said first workpiece during said steps b) and c), and optically detecting a surface tangent plane of a surface of said second workpiece, and then determining said actual value of said seam position as a spacing distance between said laser beam entry point and said surface tangent plane.

23. The method according to claim 16, wherein said adjusting in said step f) is carried out so as to change a beam incidence angle of a beam axis of said laser beam relative to a plane of a surface of said second workpiece.

24. The method according to claim 23, further comprising optically detecting said beam axis of said laser beam and said plane of said surface of said second workpiece, and then determining said beam incidence angle.

25. The method according to claim 16, further comprising providing an externally generated or input value as said nominal desired seam information for use in said step e).

26. The method according to claim 16, further comprising calling up a stored value from a memory as said nominal desired seam information for use in said step e).

27. The method according to claim 16, further comprising, before said step b), a preliminary step of adjusting at least one of said location and said orientation of said laser beam source to an initial adjustment based on and dependent on said nominal desired seam information.

28. The method according to claim 16, further comprising, after said step a) and before said step b), an additional step of optically sensing an area of said joint of said first and second workpieces, and determining therefrom said nominal desired value of said physical geometric parameter that is to be provided for said weld seam to be formed.

29. The method according to claim 16, further comprising obtaining interference value information characterizing an interference that interferes with at least one of said steps b), c) and d), and if said actual seam information is missing or faulty, then substituting said interference value information for said actual seam information in carrying out said comparing in said step e).

30. The method according to claim 16, wherein said first workpiece is a stiffening stringer and said second workpiece is a flat sheetmetal shell component for fabricating an aircraft fuselage shell.

* * * * *